July 13, 1965

O. T. DAVIS 3,194,466

GAS BACKING BLOCKS FOR WELDED JOINTS

Filed Feb. 23, 1961

INVENTOR.
ORLAND T. DAVIS
BY
ATTORNEYS

United States Patent Office 3,194,466
Patented July 13, 1965

3,194,466
GAS BACKING BLOCKS FOR WELDED JOINTS
Orland T. Davis, 6273 Arlington Blvd., Richmond, Calif.
Filed Feb. 23, 1961, Ser. No. 91,156
3 Claims. (Cl. 228—42)

This invention relates to the welding of pipes, vessels, and other hollow members, and is particularly directed to the establishment of a rarified gas pocket at controlled pressures in backing relation to a joint between hollow members being welded whereby a sound welded joint having a smooth interior surface free of oxidation and other gas impurities is produced.

Heliarc or other gas shielded arc welding processes are known to produce a weld that is free of oxides and other impurities in the region of the weld surface. However, where hollow members such as sections of pipe or the like are welded in the foregoing manner there is a severe tendency for the interior surface of the welded joint to become oxidized or to otherwise contain impurities. Furthermore, the interior surface of the welded joint tends to bow inwardly and form a rim or other protuberance by virtue of the lack of support at the interior of the joint during the welding process.

In order to overcome the foregoing difficulties, I have provided a means for establishing a sealed backing pocket at the interior surface of a joint between adjacent sections of pipe or other hollow members. In addition, provision is made to effect a continuous flow of rarified gas, such as argon, through the pocket at controlled pressure such that the resulting backing pocket of gas provides interior support to the joint during the welding thereof as well as prevents oxidation and other gas impurities from being present in the interior weld surface.

It is therefore an object of the present invention to provide a method and means for producing a sound welded joint between hollow members such as pipes and the like with the weld being free of oxidation and other gas impurities and the interior surface thereof being smooth and free of protuberances.

It is another object of the invention to provide apparatus for producing a sealed pocket interiorly adjacent a joint between hollow members and facilitating a continuous flow of rarified gas through the pocket at controlled pressures.

It is still another object of the invention to provide apparatus of the class described which is readily adaptable to pipes or tubes of different size.

Yet another object of the invention is the provision of apparatus of the class described having means for warning a welding operator when the pocket seal has been broken such that the welding process may be terminated until proper gas backing conditions are restored.

It is a further object of the invention to provide apparatus of the class described wherein the gas flow rate into and out of the sealed pocket is readily adjustable to provide a substantial range of gas backing pressures in the pocket.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
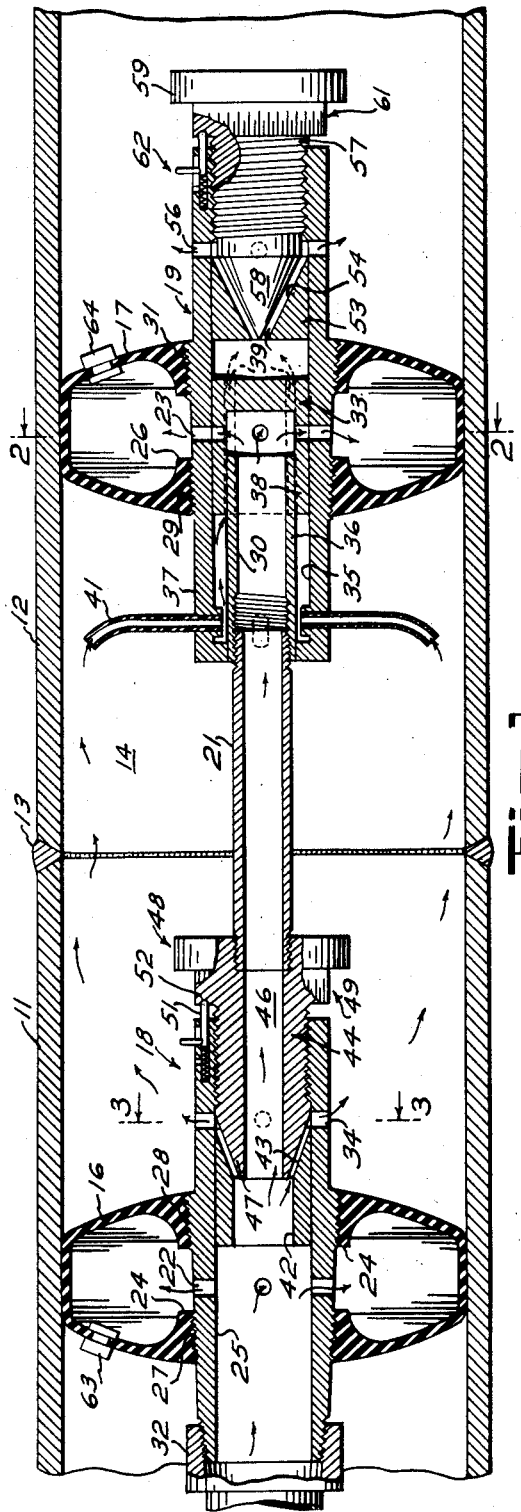
FIGURE 1 is a diametric sectional view of the apparatus of the invention as employed to establish a gas backing pocket interiorly adjacent the joint between coaxially abutting sections of pipe to be welded.

Referring now to the drawing, FIGURE 1 in particular, there is illustrated a pair of coaxially aligned abutting pipe sections 11, 12 which are to be welded together. These sections are first tack welded or otherwise preliminarily attached in the joint region 13, the final welded joint to be accomplished, however, by heliarc, or another form of shielded gas welding. Although such final form of welding produces an oxidation free weld at the surfaces to which the weld is applied (normally the exterior surface), it will be appreciated that the interior surface of the welded joint is normally open to atmosphere and therefore highly susceptible to oxidation. Furthermore, since the interior pipe section surfaces are unsupported, they tend to bulge inwardly in the region of the joint during the application of the welding heat to thus form a rim or other undesirable protuberance.

The difficulties just noted are overcome in accordance with the present invention by the establishment of a sealed pocket 14 at the interior of the pipe sections in the region of the tack-welded joint 13. A rarified gas, such as argon, is circulated through the pocket at a controlled flow rate commensurate with the establishment of a gas pressure in the pocket sufficient to support and prevent inward collapse of the pipe walls under high welding temperature conditions. With the pressurized rarified gas pocket thus backing the joint 13, a heliarc or other welding flame is applied to the exterior surface of the joint in the usual manner of welding. By virtue of the backing pocket 14, a clean interior joint surface free of oxidation or other gas impurities is produced. Furthermore, the interior joint surface is free of protuberances and the like due to the supporting pressure of the pocket during the welding operation.

Considering now preferred apparatus for the establishment of the rarified gas backing pocket 14 in the conduct of the welding method, it is to be noted that the apparatus basically includes means for temporarily sealing the pipe section bores on opposite sides of the joint 13, and means for controllably introducing rarified gas to and extracting it from the resulting pocket defined between the seals. The means for sealing the pipe bore preferably comprises a pair of axially spaced inflatable sealing tubes 16, 17 of rubber or the like, which when inflated, expand radially outward into pressure-tight sealing engagement with the interior wall surfaces of the pipe sections 11, 12. The tubes are advantageously of toroidal form and respectively concentrically mounted upon gas supply tubes 18, 19 communicably interconnected by an intermediate spacer tube 21. The supply tubes 18, 19 respectively include pluralities of circumferentially spaced inflate ports 22 and 23 in underlying relation to the sealing tubes and in communication with the central passages 25, 30 of the supply tubes. Such ports communicate with the interiors of the sealing tubes through slots 24, 26 at thier inner rims. The supply tubes, moreover, are provided with grooved regions 27, 28 and 29, 31 on opposite sides of the inflate ports to sealingly engage the inner rims of the sealing tubes on opposite sides of the slots 24, 26 thereof. Thus, sealing tubes having a variety of outer diameters may be interchangeably mounted upon the supply tubes in communication with the inflate ports to accommodate pipes of varied sizes.

Supply tube 18 is provided at its outer end with a coupling 32 for connection to a source (not shown) of argon or other rarified gas, and in communication with central passage 25. The other supply tube 19, on the other hand is provided with a plug 33 outwardly adjacent the ports 23 and defining the end of its central passage 30. Hence a source of gas may be connected by means of coupling 32 to the supply tube 18, the gas flowing, as depicted by the arrows in FIGURE 1, through the inflate ports 22 into the sealing tube 16. In addition the gas flows through interconnecting tube 21 into the central passage 30 of supply tube 19 to thereat encounter the plug 33 and be forced to flow through the ports 23 into the sealing tube 17. In order that both sealing tubes be inflated at the presssure of the gas supply, the sums of the cross-sectional areas of the ports 22, 23 are respectively equal to the cross-sectional area of the gas supply line connected to the coupling 32. With the sealing tubes inflated into engagement with the pipe section 11, 12 the sealed pocket 14 is thus defined in the region of the joint 13.

Figure 2:
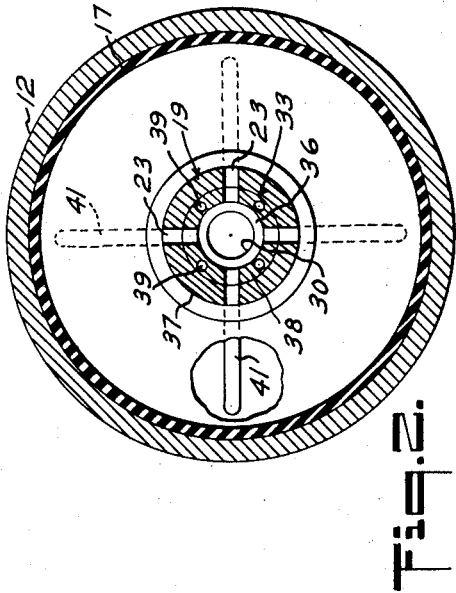
FIGURE 2 is a sectional view taken at line 2—2 of FIGURE 1 and illustrating particularly the pocket gas outlet portion of the apparatus.
Figure 3:
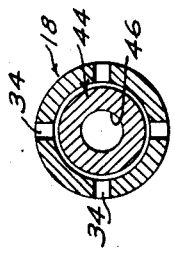
FIGURE 3 is a sectional view taken at line 3—3 of FIGURE 1, illustrating particularly the pocket gas inlet portion of the apparatus.

Considering now the means for controllably introducing gas to and extracting it from the sealed pocket 14 in order that a continuous gas flow at constant pressure is established threthrough, it is to be noted that supply tube 18 is provided with valved radially extending inlet ports 34 communicating with central passage 25 and spaced axially inward from sealing tube 16 to be hence in communication with the pocket 14. Supply tube 19 is provided with a closed annulus 35 at its inner end concentrically about central passage 30. More specifically supply tube 19 comprises inner and outer concentrically spaced tubular members 36, 37 with the central passage 30 being defined by inner member 36 and the annulus 35 being defined between the members. In addition to the annulus being closed at its inner end, the plug 33 is cupped such that it not only closes central passage 30, but in addition closes the annulus, the peripheral wall 38 of the plug being disposed therein. The plug is provided, however, with a plurality of circumferentially spaced longitudinally extending passages 39 (see FIGURE 2) through its peripheral wall and terminating at the interior of outer member 37 outwardly adjacent the end wall of the plug. The longitudinal passages 39 are circumferentially staggered relative to the inflate ports 23 such that there is no interference therebetween.

A plurality of gas escape tubes 41 are provided in communication with the annulus 35, the escape tubes extending radially outward from the supply tube 19 at positions spaced axially inward from sealing tube 17 and therefore in communication with the pocket 14. It is particularly important to note that the escape tubes 41 are of a sufficient length to terminate closely adjacent the inner periphery of pipe section 12. Hence, the portion of gas that is adjacent the joint 13 tends to flow into the escape tubes whereby fresh gas is always in the region being welded.

From the escape tubes the gas passes through the annulus 35 and longitudinal passages 39 to the interior of outer member 37 at its outside end. Such end of the member is valved such that the flow of gas escaping from the pocket 14 through tubes 41 may be controlled. Thus, it will be appreciated that by adjusting the settings of the valved inlet ports 34 and valved end opening of supply tube member 37, the pressure of gas in the pocket 14 may be varied as desired.

As regards the preferred construction of the valve means for adjusting gas flow through the inlet ports 34, it should be noted that an enlarged constricting section 42 is provided within the supply tube 18 intermediate the inflate ports 22 and inlet ports 34. Such constricting portion is formed with a bevelled seat portion 43 terminating outwardly adjacent the inlet ports. A cylindrical valve body 44 having a central passage 46 and a tapered end 47 for engagement with the seat 43 is threadably secured within the inner end of the supply tube. Such body includes an enlarged adjusting knob portion 48 at its inner end with the knob portion being threadably secured to the adjacent end of interconnecting tube 21. By turning the knob, the valve body is screwed in or out to thus vary the space between its tapered end and the seat 43, and therefore the flow rate through the inlet ports. In order that the flow rate may be readily preset to desired values, the knob is provided with vernier markings as indicated at 49. Provision is also made to lock the knob at a desired setting, a spring loaded latch plunger 51 being carried by the supply tube 18 for selective engagement with a plurality of circumferentially spaced recesses 52 in the knob.

The valve means for adjusting outlet gas flow from the pocket 14 is in basic respects similar to the inlet valve means just described. More specifically, the outer member 37 of supply tube 19 is provided with a constricting section 53 outwardly adjacent end plug 33, such section having a tapered bore defining a valve seat 54. Outwardly adjacent the constricting section there are provided a plurality of outlet ports 56 extending radially through the member 43. A valve body 57 having a tapered end 58 engageable with the seat 54 is threadably secured within the end of member 37, the body having an adjusting knob portion 59 with vernier markings thereon as indicated at 61. In addition, latch means 62, identical to that described relative to the inlet valve, is provided to lock the valve body 57 at any desired flow setting as indicated by the markings 61.

With the apparatus of the invention constructed as just described, same may be inserted into a pair of tack welded pipe sections with the sealing tubes 16, 17 on opposite sides of the joint. The valve adjusting knobs 48, 59 may be preset for any desired gas flow rate and backing pressure, an indicated by the markings 49, 61, and locked by means of the latches 51, 62. The coupling 32 may be then connected to a rarified gas source, the sealing tubes 16, 17 being thus inflated and expanding into sealing engagement with the pipe section walls to form the pocket 14. The pocket thereafter fills with rarified gas at the preset pressure, the gas continuously flowing through the pocket at the preset flow rate whereby fresh gas is at all times adjacent the joint 13. The heliarc or other external welding operation is thereafter conducted at the joint 13 with the resulting weld having the desirable properties discussed hereinbefore due to the pressurized backing pocket of rarified gas.

It will be appreciated that should the seal between either of the sealing tubes 16, 17 be broken, the gas pocket 14 would be contaminated with air and the resulting weld would be unsatisfactory. Accordingly, it is of advantage for the welding operator to be warned when the seal is broken such that the seal may be restored prior to continuance with the welding operation. There is consequently provided as an extremely important adjunct of the invention warning means for shutting off the welding current or otherwise indicating when either of the sealing tubes 16, 17 are deflated to an extent that the seal is broken. More specifically pressure sensitive devices 63, 64 are provided in communication with the sealing tubes for producing a control signal which may be utilized to open the welder circuit or actuate an alarm signal when the tube pressure drops below a predetermined value. A variety of specific arrangements may be employed as the devices 63, 64, such as bellows controlled switches having contacts that are closed when the bellows contracts a predetermined amount from its fully expanded length.

What is claimed is:

1. Apparatus of the character described comprising, in combination, a pair of coaxially disposed supply tubes having their inner confronting ends in spaced relation, a first of said tubes having at least one radially extending inlet port in the wall thereof adjacent said inner end thereof, means defining a valve seat adjacent said port, a tubular valve body mounted on said inner end of said first tube is communication therewith and being axially adjustable relative to said valve seat for varying the opening of said port communicating with the interior of said first tube, a tubular member disposed concentrically within the inner end portion of the second supply tube and defining an annular space between said second tube and said tubular member, an intermediate spacer tube secured between one end of said tubular member and said tubular valve body to provide communication therebetween, a cup shaped plug disposed in said second supply tube with an end wall axially spaced from the other end of said tubular member and having its side walls concentrically interposed between said tubular member and said second supply tube in sealing relation therewith, said plug thereby closing off one end of said annular space, means closing off the other end of said annular space, said plug having at least one axially extending bore communicating between said annular space and the interior of said second supply tube axially outwardly of said plug, at least one outlet port disposed in the wall of said second supply tube adjacent the outer end thereof, valve means adjusting the opening of said outlet port in communication with said second supply tube, a plurality of radially extending escape tubes disposed circumferentially about said second supply tube in communication with said annular space, said escape tubes having end openings disposed in longitudinally spaced relation with said inlet ports and in radially spaced relation with said second supply tube, said first supply tube having at least one inflate port in the wall thereof and spaced axially outwardly from said inlet port, said second supply tube having at least one inflate port in the wall thereof and spaced axially inwardly from said outlet port, said plug having a port in the side wall thereof communicating with said inflate port of said second supply tube providing communication with said tubular member, and a pair of inflatable sealing tubes each respectively mounted concentrically on one of said supply tubes in communication with the respective inflate ports thereof, said escape tubes and inlet port being disposed intermediate said sealing tubes.

2. The combination of claim 1 further defined by pressure sensitive means in communication with each of said sealing tubes for producing an electrical signal when the pressure within one of the sealing tubes is less than a predetermined value.

3. Tube welding apparatus comprising a pair of axially spaced inflatable sealing tubes, gas supply tube means extending coaxially through said sealing tubes and having a central passage with at least one inflate port in respective communication with each sealing tube, said supply tube means being adapted for connection at one end of its central passage to a gas source and being closed at the other end of said central passage, said supply tube means having radially extending inlet ports axially intermediate said sealing tubes in communication with said central passage, said supply tube means defining an outlet passage extending from a position intermediate said sealing tubes to a position disposed outwardly of one of said sealing tubes, a plurality of radially extending gas escape tubes secured to said supply tube means in communication with said outlet passage, said escape tubes each having an end opening disposed intermediate said sealing tubes in longitudinally spaced relation with said inlet ports and spaced radially from the axis of said supply tube means, first valve means for controlling the rate of flow of gas through said inlet ports, and second valve means for controlling the rate of flow of gas through said outlet passage.

References Cited by the Examiner

UNITED STATES PATENTS

| 1,221,733 | 4/17 | Henderson | 138—90 |
| 1,506,418 | 8/24 | Evansta et al. | 138—90 |
| 2,164,195 | 6/39 | Waltermire | 138—90 XR |
| 2,279,257 | 4/42 | Svirsky | 138—90 XR |
| 2,481,013 | 9/49 | Henderson | 138—90 |
| 2,566,708 | 9/51 | Trevaskis | 91—454 |
| 2,582,268 | 1/52 | Nerad | 29—494 |
| 2,585,819 | 2/52 | Moore | 29—494 |
| 2,685,629 | 8/54 | Peck | 113—136 |
| 2,796,508 | 6/57 | Holman et al. | 113—136 |

OTHER REFERENCES

Mueller, abstract of application S.N. 134,286, published June 30, 1953, 671 O.G. 1498.

CHARLES W. LANHAM, *Primary Examiner.*

NEDWIN BERGER, JOHN F. CAMPBELL, *Examiners.*